United States Patent
Baek et al.

(10) Patent No.: US 11,746,842 B2
(45) Date of Patent: Sep. 5, 2023

(54) PAD SPRING FOR VEHICLE BRAKE

(71) Applicant: HL MANDO CORPORATION, Pyeongtaek (KR)

(72) Inventors: Seung Tae Baek, Seongnam (KR); Yun Young Oh, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 164 days.

(21) Appl. No.: 17/161,666

(22) Filed: Jan. 29, 2021

(65) Prior Publication Data

US 2021/0239169 A1 Aug. 5, 2021

(30) Foreign Application Priority Data

Feb. 3, 2020 (KR) .................. 10-2020-0012422

(51) Int. Cl.
*F16D 65/097* (2006.01)
*F16D 127/02* (2012.01)

(52) U.S. Cl.
CPC ..... *F16D 65/0972* (2013.01); *F16D 65/0978* (2013.01); *F16D 2127/02* (2013.01)

(58) Field of Classification Search
CPC .... F16D 65/092; F16D 65/095; F16D 65/097; F16D 65/183; F16D 55/2262; F16D 65/0972; F16D 65/0977; F16D 65/0978; F16D 66/02; F16D 65/0976; F16D 65/00; F16D 69/0408; F16D 2127/002
See application file for complete search history.

(56) References Cited

U.S. PATENT DOCUMENTS 7,086,506 B2 * 8/2006 Wemple .............. F16D 65/0977
188/73.38
7,318,503 B2 * 1/2008 Farooq ................ F16D 65/0974
188/73.31

(Continued)

FOREIGN PATENT DOCUMENTS

DE 102007017251 A1 * 10/2008
DE 202017100837 U1 3/2017

(Continued)

OTHER PUBLICATIONS

DE Office Action dated Oct. 6, 2021.

*Primary Examiner* — Robert A. Siconolfi
*Assistant Examiner* — Mahbubur Rashid
(74) *Attorney, Agent, or Firm* — Harvest IP Law, LLP

(57) ABSTRACT

The present invention relates to a pad spring for a vehicle brake. To this end, according to an aspect of the present invention, there are provided pad springs for a vehicle brake which are installed in a pad carrier to apply elastic forces in directions in which a pad plate including a brake pad is spaced apart from a disc when an operation of a vehicle brake is released, wherein the pad carrier includes a leading side support frame, a trailing side support frame, an inner side support beam, and an outer side support beam, wherein the support beams connect the support frames, and the pad spring is provided on each of the inner side support beam and the outer side support beam, wherein at least one among a width, a length, and a thickness of a retraction bar provided on one of the pad springs is different from that provided on each of the remaining pad springs so that an elastic force is applied to the pad plate.

11 Claims, 9 Drawing Sheets

(56) References Cited

U.S. PATENT DOCUMENTS

| | | | | |
|---|---|---|---|---|
| 7,926,631 B2 * | 4/2011 | Roberts | ............... | F16D 55/226 |
| | | | | 188/73.39 |
| 8,636,119 B2 * | 1/2014 | Bach | ................. | F16D 65/0979 |
| | | | | 188/73.38 |
| 8,973,720 B2 * | 3/2015 | Plantan | ............... | F16D 65/095 |
| | | | | 188/73.31 |
| 10,400,838 B2 * | 9/2019 | Reynolds | ........... | F16D 65/0977 |
| 2015/0001011 A1 * | 1/2015 | Zhang | ................... | F16D 65/12 |
| | | | | 188/72.3 |
| 2016/0076611 A1 * | 3/2016 | Boyle | ................. | F16D 65/0972 |
| | | | | 188/72.3 |
| 2019/0249731 A1 * | 8/2019 | Demorais | ............ | F16D 65/097 |
| 2019/0338816 A1 * | 11/2019 | Denhard | .............. | F16D 55/228 |
| 2020/0040953 A1 * | 2/2020 | Baek | .................. | F16D 65/0972 |

FOREIGN PATENT DOCUMENTS

| | | | |
|---|---|---|---|
| DE | 102017222639 A1 | | 8/2018 |
| EP | 1980768 A2 | * | 10/2008 |
| EP | 2792899 A1 | * | 10/2014 |
| FR | 2774733 A1 | * | 8/1999 |
| JP | 5924889 B2 | * | 5/2016 |
| KR | 1999008095 A | | 11/1999 |
| WO | WO-2016124389 A1 | * | 8/2016 |
| WO | WO-2018003197 A1 | * | 1/2018 |

* cited by examiner

PAD SPRING FOR VEHICLE BRAKE

CROSS-REFERENCE TO RELATED APPLICATION

This application claims priority to and the benefit of Korean Patent Application No. 2020-0012422, filed on Feb. 3, 2020, the disclosure of which is incorporated herein by reference in its entirety.

BACKGROUND

1. Field of the Invention

The present invention relates to a pad spring for a vehicle brake.

2. Discussion of Related Art

Generally, a vehicle brake may include a brake pad configured to rub against a brake disc to decelerate or stop a vehicle. Such a brake may be installed to be operated at one or more or all of front wheels and rear wheels of the vehicle.

The brake pad may be installed in a caliper housing, and when the brake operates and a hydraulic pressure is applied to a piston, the brake pad moves into the caliper housing to press the brake disc so that vehicle braking is performed.

In addition, when the operation of the brake is released, the piston moves backward and the brake pad is separated from the brake disc so that a braking state is released, wherein a pad spring configured to apply an elastic force to a pad plate to separate the brake pad therefrom at high speed is installed on a pad carrier.

FIG. 1A is a view illustrating a conventional vehicle brake, and pad springs 4, which apply elastic forces in directions in which pad plates 3 including brake pads 2 are spaced apart from a brake disc, are installed in a pad carrier 1.

In such a conventional brake, the pad springs 4 are provided at a leading side and a trailing side, and as illustrated in FIG. 1B, supports 4a, 4b, and 4c are provided on each of the pad springs 4 so that the pad plates 3 are fixedly installed on the pad carrier 1, and elastic pieces 4d which apply elastic forces to the pad plates 3 are formed on the pad springs 4.

However, the conventional pad springs 4 are provided to apply the same elastic forces to the pad plates 3 provided at inner and outer sides of the pad carrier 1, and in this case, there is a limit in that an elastic force applied to the pad plate 3 may not be variously adjusted to match with recent various braking specifications.

Accordingly, there is a need to reduce such a limit.

RELATED ART

Patent Document (Patent Document 1) Korean Patent Application Publication No. 10-1999-0080952 (Published on Nov. 15, 1999)

SUMMARY OF THE INVENTION

The present invention is directed to providing pad springs for a vehicle brake, which have retraction performances that are different at an inner side, an outer side, a leading side, and a trailing side of a pad carrier.

The present invention is also directed to providing pad springs for a vehicle brake capable of preventing pad springs from being misassembled.

Technical objectives to be solved by the present invention are not limited to the above-described technical objectives, and other objectives which are not described above will be clearly understood through the description below by those skilled in the art.

According to an aspect of the present invention, there are provided pad springs for a vehicle brake which are installed in a pad carrier to apply elastic forces in directions in which a pad plate including a brake pad is spaced apart from a disc when an operation of a vehicle brake is released, wherein the pad carrier includes a leading side support frame, a trailing side support frame, an inner side support beam, and an outer side support beam, wherein the support beams connect the support frames, and the pad spring is provided on each of the inner side support beam and the outer side support beam, and at least one among a width, a length, and a thickness of a retraction bar provided on one of the pad springs is different from that provided on each of the remaining pad springs so that an elastic force is applied to the pad plate.

The pad spring may be provided at each of a leading side and a trailing side of each of the inner side support beam and the outer side support beam, and at least one among the width, the length, and the thickness of the retraction bar provided on the one of the pad springs may be different from that provided on each of the remaining pad springs.

The pad spring may include a fixing part fixed to the pad carrier, a pressing part including the retraction bar, and a buffer part configured to elastically support the pad plate to prevent the pad plate from colliding with the pad carrier when braking is performed, a fixing protrusion to which the fixing part is fixed may be formed on the pad carrier, and a width of the fixing protrusion formed on the inner side support beam may be different from a width of the fixing protrusion formed on the outer side support beam.

The fixing part may include a first body, an upper surface-pressing rib which is formed to extend from an upper surface of the first body and presses an upper surface of the fixing protrusion, a lower surface-supporting rib which is formed to extend from a lower surface of the first body and supports a lower surface of the fixing protrusion, and a side surface-pressing rib which is formed to extend from a side surface of the first body and presses a side surface of the fixing protrusion.

A fixing groove having a recessed shape may be formed in the fixing protrusion, and an auxiliary pressing rib inserted into and disposed in the fixing groove may be formed on the fixing part to prevent separation of the fixing part.

A second body from which the retraction bar is formed to extend may be provided on the pressing part, and the retraction bar may be elastically deformed in a state in which the retraction bar is formed to extend from one side of the second body.

An identification part having a different shape may be formed on each of the pad springs.

The identification part may include an identification rib having a different shape in each of the pad springs, and a corresponding surface having a shape corresponding to the identification rib may be formed on the pad carrier.

A buffer rib configured to elastically support the pad plate may be formed on the buffer part.

Guide ribs configured to guide the pad plate to be inserted into the pad spring are respectively formed in the buffer part and the pressing part.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a set of views illustrating a conventional vehicle brake, wherein

DETAILED DESCRIPTION OF EXEMPLARY EMBODIMENTS

Figure 1A:
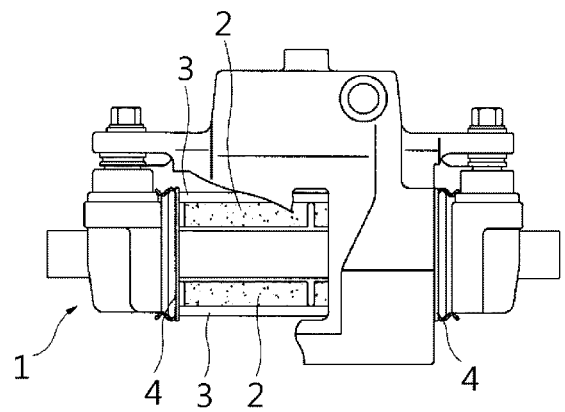
FIG. 1A is a partial cross-sectional view illustrating the conventional vehicle brake.

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to descriptions are omitted in the drawings in order to clearly explain the present invention, and the same or similar parts are denoted by the same reference numerals throughout this specification.

It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof. In addition, when an element such as a layer, film, region, plate, or the like is referred to as being disposed "on" another portion, it includes not only the element being directly disposed on another element but also another element being disposed therebetween. Conversely, when an element such as a layer, film, region, plate, or the like is referred to as being "under" another portion, it includes not only the element being directly under another element but also another element being disposed therebetween.

Figure 1B:
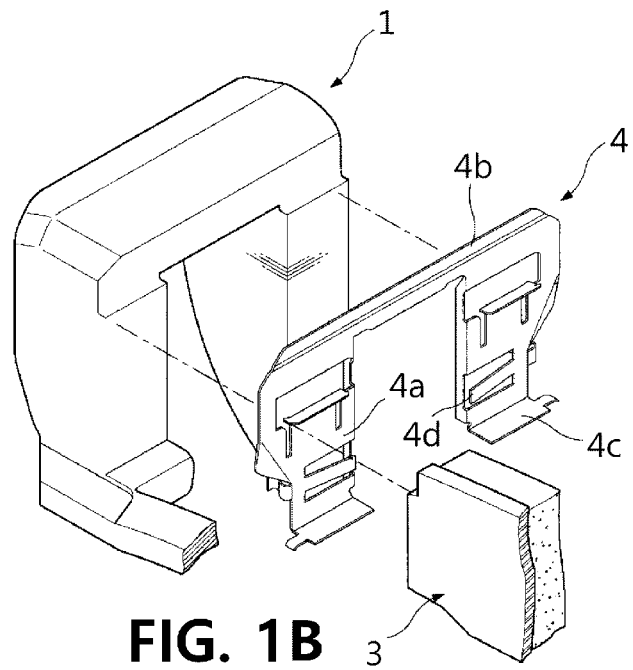
FIG. 1B is a perspective view illustrating a pad spring installed in the conventional vehicle brake.
Figure 2:
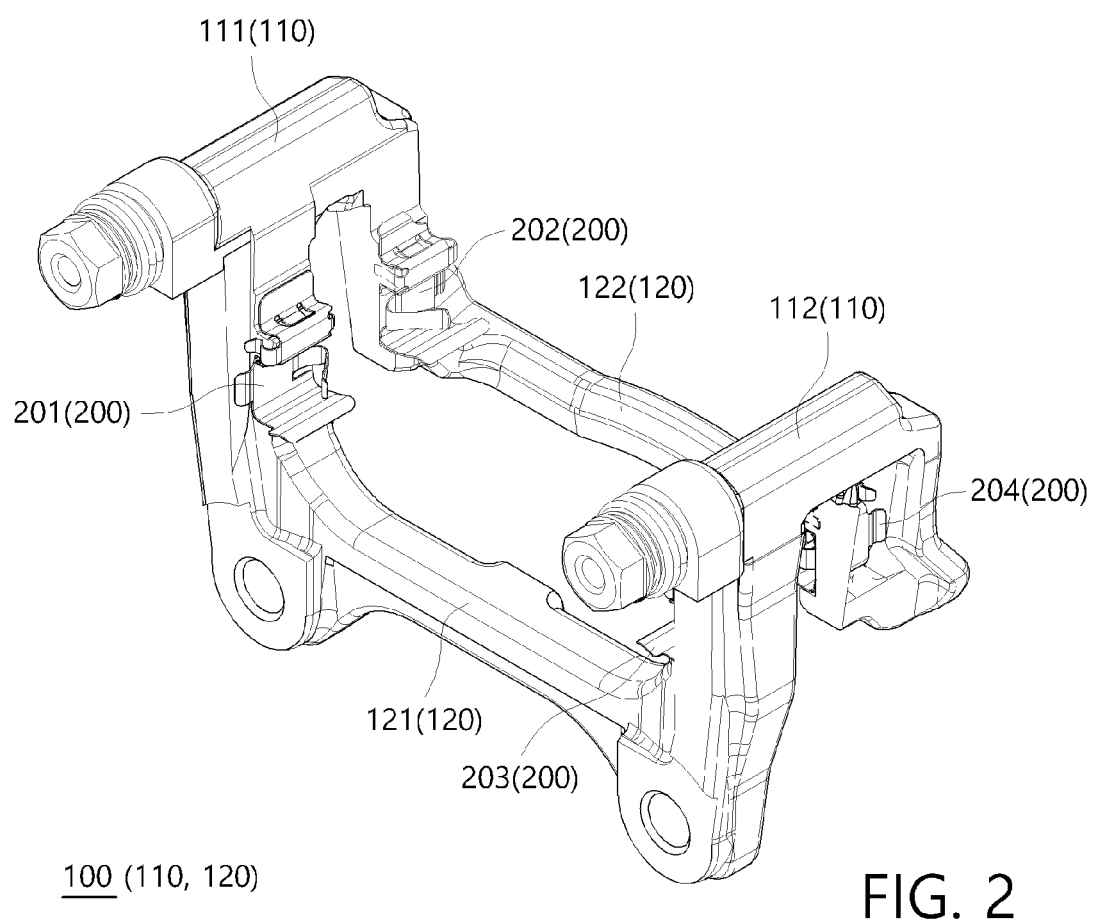
FIG. 2 is a perspective view illustrating a state in which pad springs are installed in a pad carrier according to the present invention.
Figure 3:
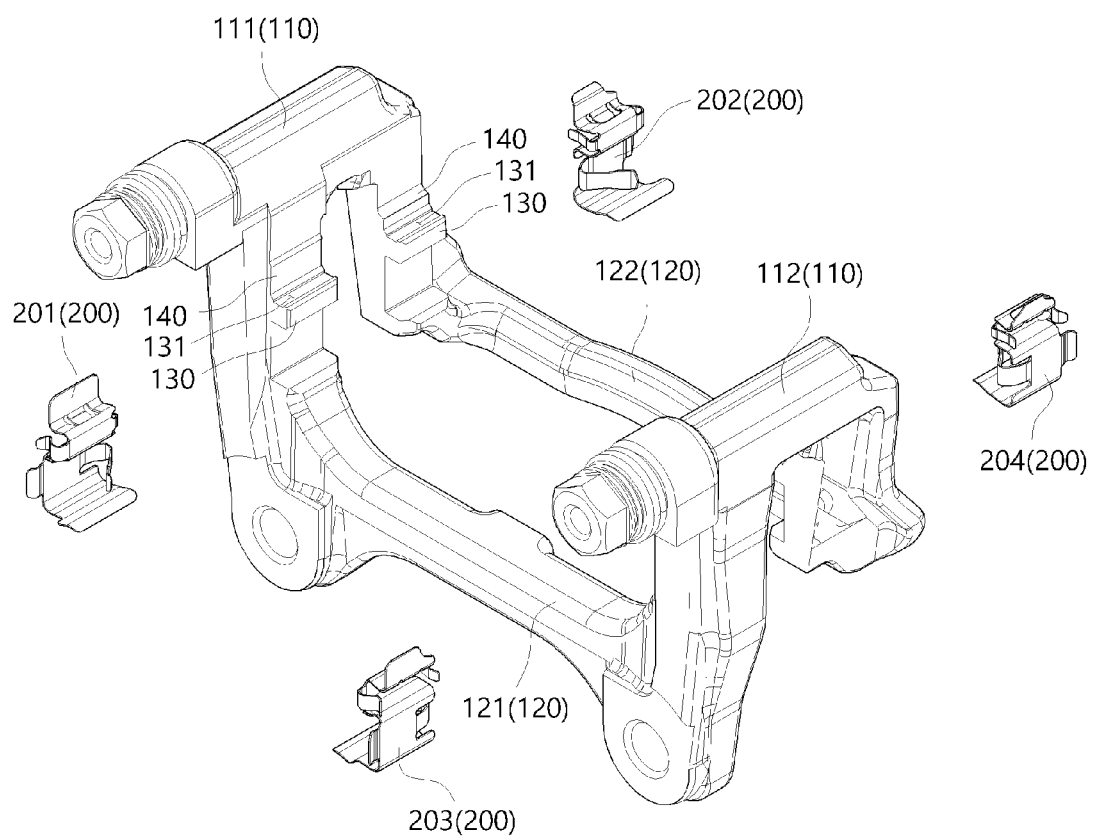
FIG. 3 is a perspective view illustrating a state in which the pad springs are separated from the pad carrier according to the present invention.
Figure 4:
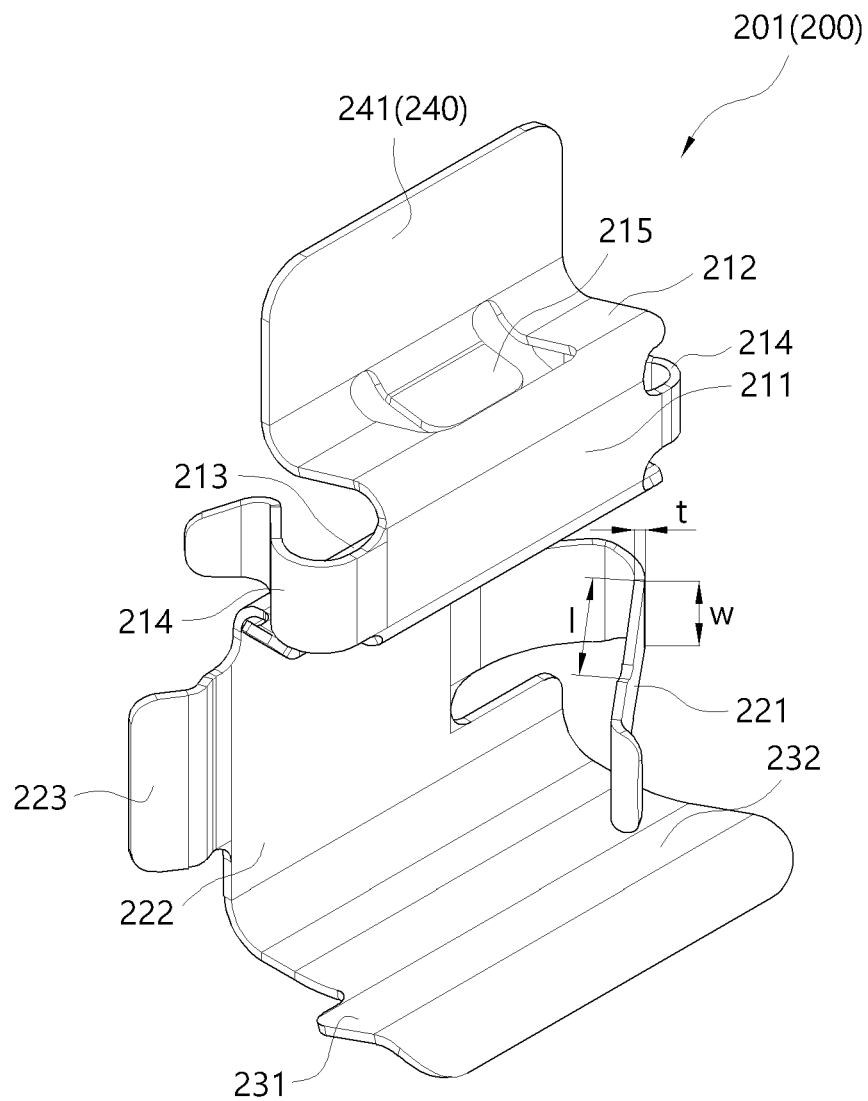
FIG. 4 is a perspective view illustrating the pad spring installed at a leading-inner side according to the present invention.
Figure 5:
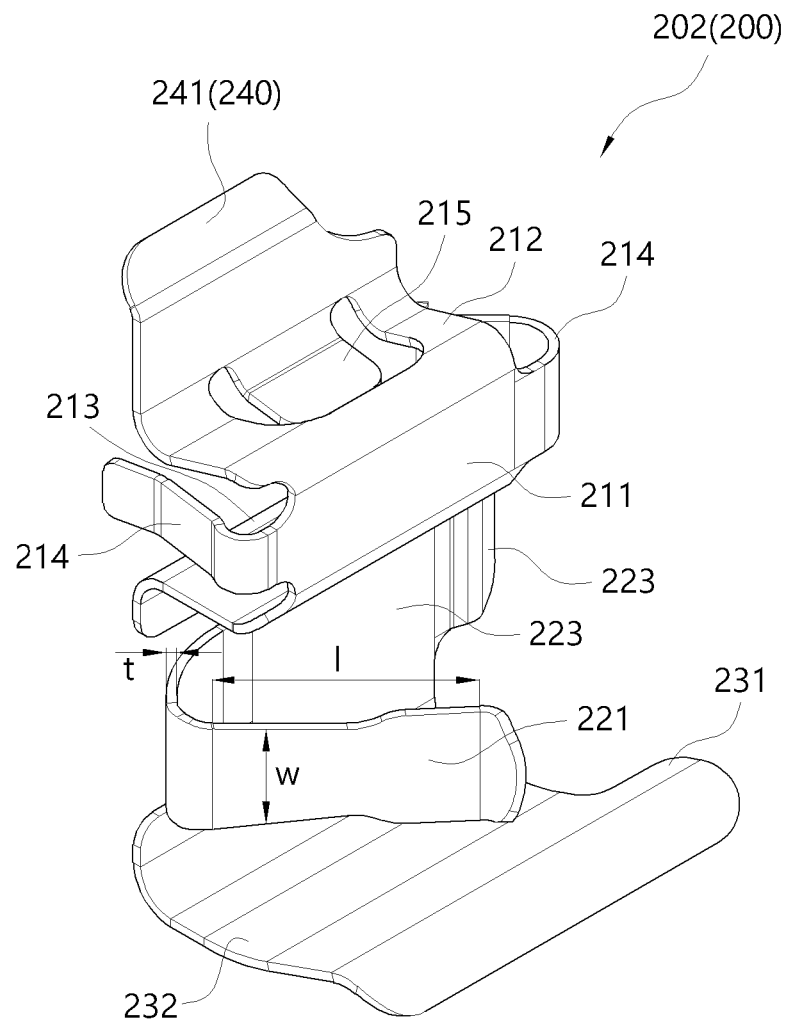
FIG. 5 is a perspective view illustrating the pad spring installed at a leading-outer side according to the present invention.
Figure 6:
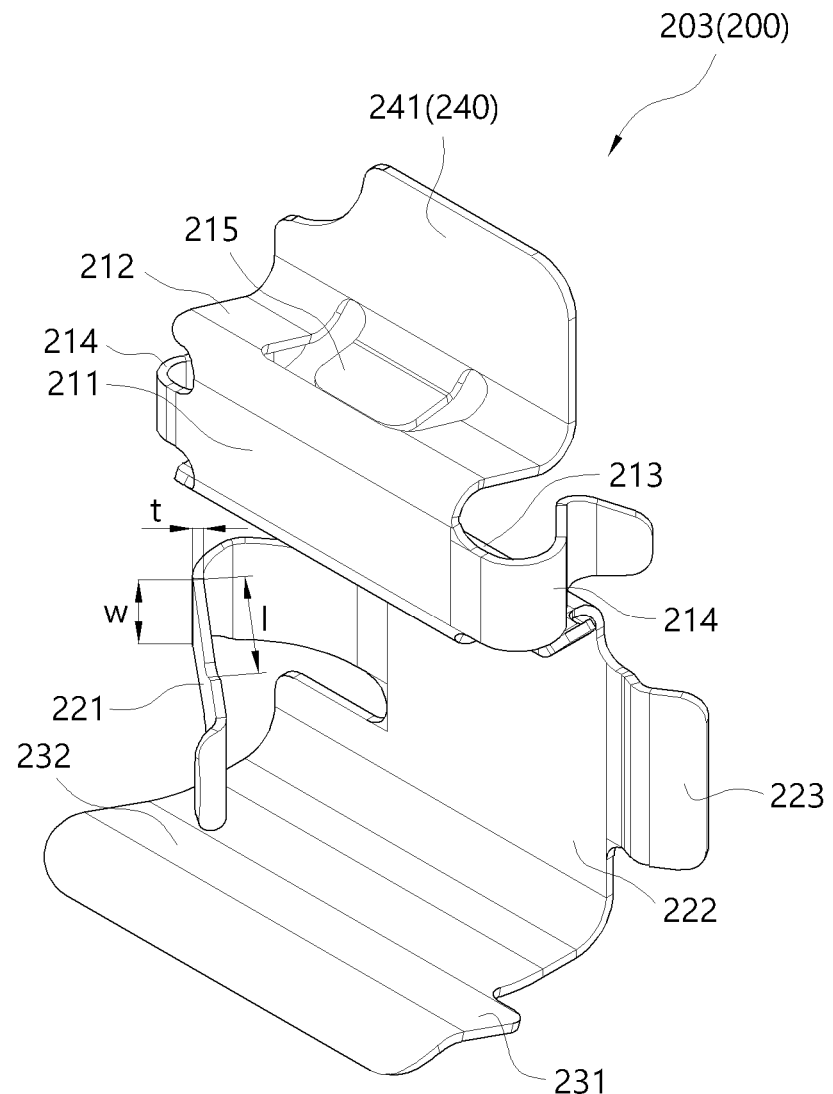
FIG. 6 is a perspective view illustrating the pad spring installed at a trailing-inner side according to the present invention.
Figure 7:
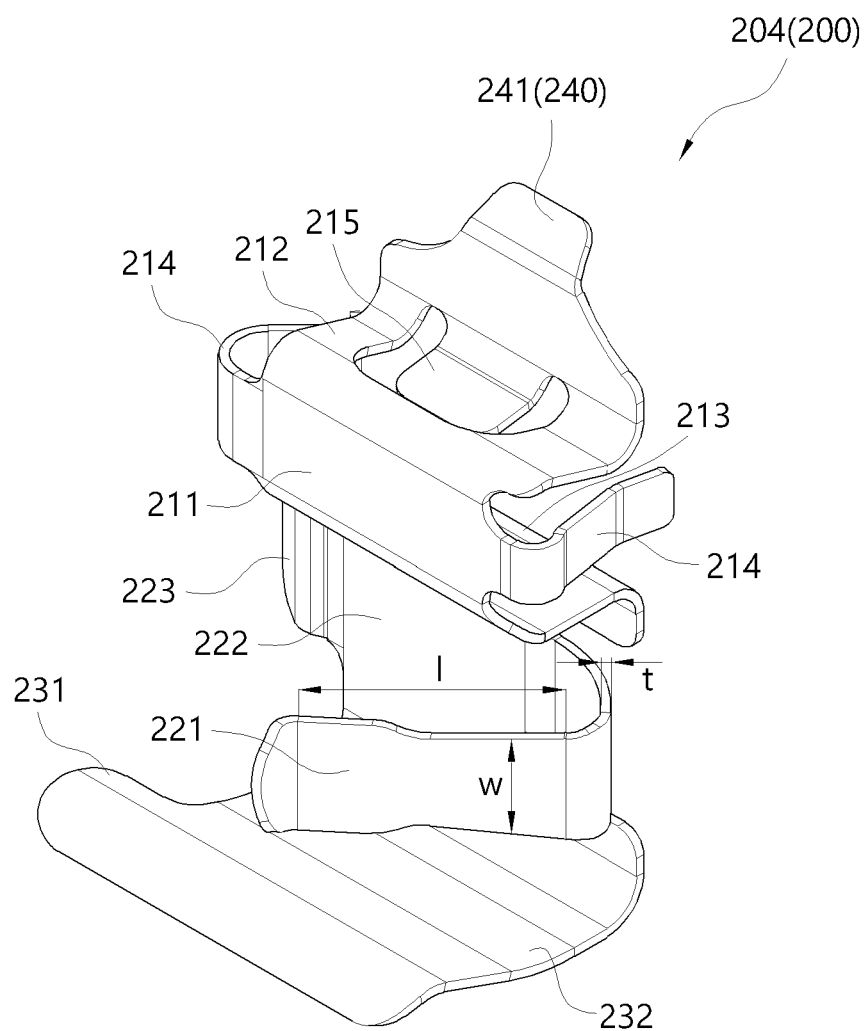
FIG. 7 is a perspective view illustrating the pad spring installed at a trailing-outer side according to the present invention.
Figure 8:
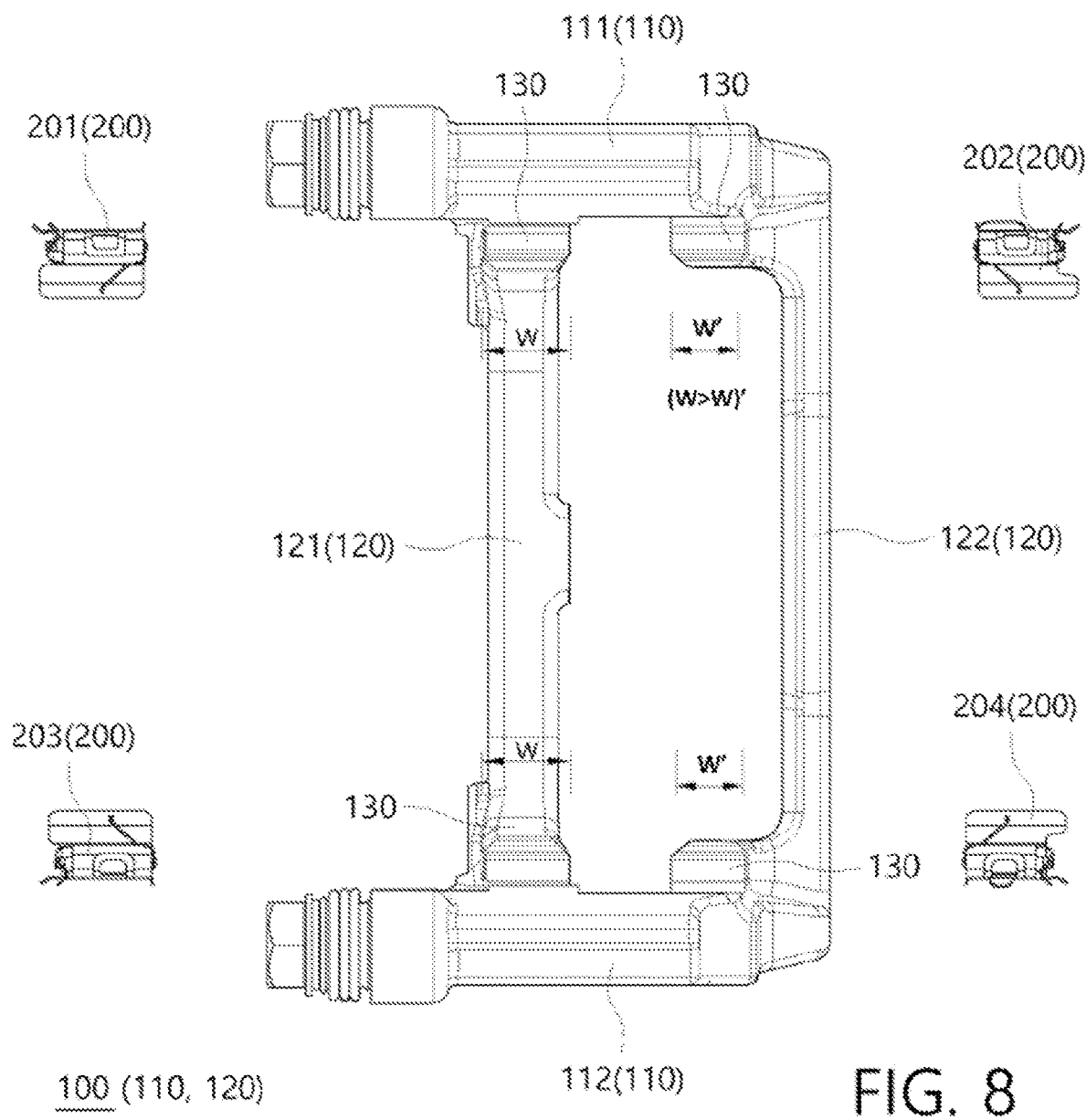
FIG. 8 is a plan view illustrating the state in which the pad springs are separated from the pad carrier according to the present invention.
Figure 9:
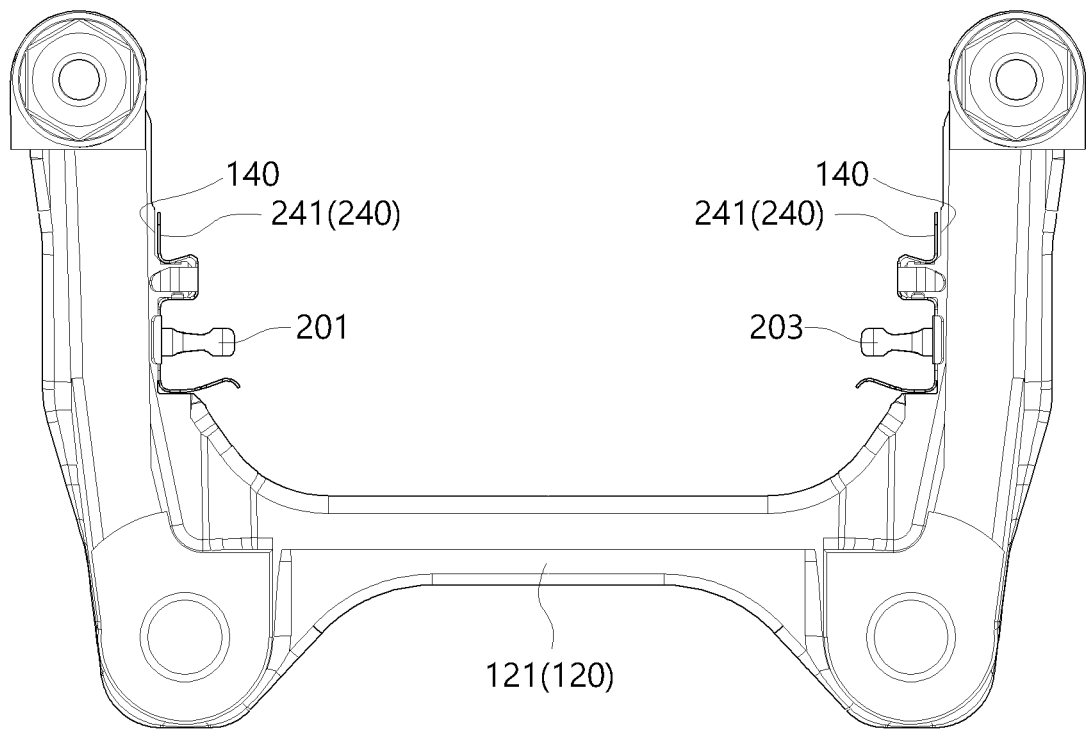
FIG. 9 is a side view illustrating a state in which the inner side pad springs are installed in the pad carrier according to the present invention.
Figure 10:
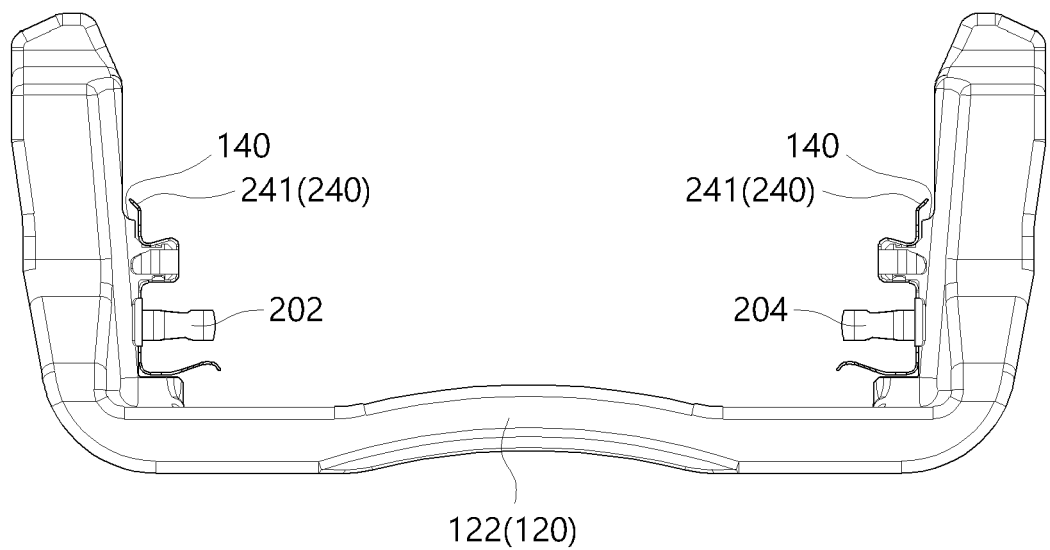
FIG. 10 is a side view illustrating a state in which the outer side pad springs are installed in the pad carrier according to the present invention.

FIG. 1 is a set of views illustrating a conventional vehicle brake, wherein FIG. 1A is a partial cross-sectional view illustrating the conventional vehicle brake, and FIG. 1B is a perspective view illustrating a pad spring installed in the conventional vehicle brake, FIG. 2 is a perspective view illustrating a state in which pad springs are installed in a pad carrier according to the present invention, FIG. 3 is a perspective view illustrating a state in which the pad springs are separated from the pad carrier according to the present invention, FIG. 4 is a perspective view illustrating the pad spring installed at a leading-inner side according to the present invention, FIG. 5 is a perspective view illustrating the pad spring installed at a leading-outer side according to the present invention, FIG. 6 is a perspective view illustrating the pad spring installed at a trailing-inner side according to the present invention, FIG. 7 is a perspective view illustrating the pad spring installed at a trailing-outer side according to the present invention, FIG. 8 is a plan view illustrating the state in which the pad springs are separated from the pad carrier according to the present invention, FIG. 9 is a side view illustrating a state in which the inner side pad springs are installed in the pad carrier according to the present invention, and FIG. 10 is a side view illustrating a state in which the outer side pad springs are installed in the pad carrier according to the present invention.

Pad springs 200 for a vehicle brake according to one embodiment of the present invention are installed in a pad carrier 100 to apply elastic forces in directions in which pad plates including brake pads are spaced apart from a disc when an operation of the vehicle brake is released, and as illustrated in FIG. 2, the pad carrier 100 includes support frames 110 and support beams 120 which connect the support frames 110 and on which the pad springs 200 are installed. In this case, the support frames 110 include a leading side support frame 111 and a trailing side support frame 112, and the support beams 120 include an inner side support beam 121 and an outer side support beam 122.

That is, as illustrated in FIG. 2, four pad springs 200 may be installed on the pad carrier 100, and as illustrated in FIG. 3, the pad springs 200 may include a first pad spring 201 installed at a leading-inner side, a second pad spring 202 installed at a leading-outer side, a third pad spring 203 installed at a trailing-inner side, and a fourth pad spring 204 installed at a trailing-outer side.

Retraction bars 221 which apply elastic forces to pad plates when a vehicle braking operation is released are provided on the pad springs 200, and at least one among a width w, a length 1, and a thickness t of the retraction bar 221 of the pad spring 201 provided at the inner side as illustrated in FIG. 4 may be different from that of the pad spring 202 provided at the outer side as illustrated in FIG. 5 so that the retraction performance of the pad spring 201 is different from the retraction performance of the pad spring 202. In addition, at least one among a width w, a length 1, and a thickness t of the retraction bar 221 of the pad spring 203 provided at the inner side as illustrated in FIG. 6 may be different from that of the pad spring 204 provided at the outer side as illustrated in FIG. 7 so that the retraction performance of the pad spring 203 is different from the retraction performance of the pad spring 204.

In this case, the retraction performances of the outer side pad springs 202 and 204 may be higher than the retraction performances of the inner side pad springs 201 and 203, and to this end, the width w or the thickness t of the retraction bar 221 provided on each of the outer side pad springs 202 and 204 may be relatively greater than the width w or the thickness t of the retraction bar 221 of each of the inner side pad springs 201 and 203, and the length 1 of the retraction bar 221 provided in each of the outer side pad springs 202 and 204 may be relatively smaller than the length 1 of the retraction bar 221 of each of the inner side pad springs 201 and 203.

In addition, even among the outer side pad springs 202 and 204, the retraction performance of the leading side pad spring 202 may be different from the retraction performance of the trailing side pad spring 204, and to this end, at least one among the width w, the length 1, and the thickness of the retraction bar 221 provided at the leading side pad spring 202 may be different from that of the retraction bar 221 provided at the trailing side pad spring 204 as described above.

As describe above, since the pad springs 200, of which the retraction performances at the inner side, the outer side, the leading side, and the trailing side of the pad carrier 100 are different, are provided, elastic forces applied to the pad plates may be variously adjusted to match with various vehicle braking specifications.

As illustrated in FIG. 3, fixing protrusions 130 are provided on the support beams 120 to fixedly install the pad springs 200 on the pad carrier 100. The fixing protrusion 130 may be formed at each of the leading-inner side, the leading-outer side, the trailing-inner side, and the trailing-outer side. In addition, as illustrated in FIG. 4, the leading-inner side pad spring 201 includes a fixing part 210 fixed to the fixing protrusion 130, a pressing part 220 including the retraction bar 221, and a buffer part 230 elastically supporting the pad plate to prevent the pad plate from colliding with the pad carrier 100 when braking. In addition, each of the leading-outer side pad spring 202 illustrated in FIG. 5, the trailing-inner side pad spring 203 illustrated in FIG. 6, and the trailing-outer side pad spring 204 illustrated in FIG. 7 may also include the fixing part 210, the pressing part 220, and the buffer part 230 which are described above.

In this case, as illustrated in FIG. 8, a width w of the fixing protrusion 130 formed on the inner side support beam 121 may be different from a width w' of the fixing protrusion 130 formed on the outer side support beam 122. Accordingly, in order to correspond to the above description, a size of the fixing part 210 of each of the pad springs 201 and 203 installed at the inner side is different from a size of the fixing part 210 of each of the pad springs 202 and 204 installed at the outer side.

As an example, as illustrated in FIG. 8, when the width w of the fixing protrusion 130 formed on the inner side support beam 121 is relatively greater than the width w' of the fixing protrusion 130 formed on the outer side support beam 122, due to a size limitation of the fixing part 210 of each of the pad springs 202 and 204 installed at the outer side, the pad springs 202 and 204 may not be installed on the inner side support beams 121 so that a misassembly problem due to a worker's mistake may be prevented.

Although a misassembly problem may occur in that the inner side pad springs 201 and 203 in which the sizes of the fixing parts 210 are relatively large are installed on the outer side support beams 122, heights of the fixing protrusions 130 may also be different so that the misassembly problem is prevented. That is, the width w of the fixing protrusion 130 formed on the inner side support beam 121 may be greater than the width w of the fixing protrusion 130 formed on the outer side support beam 122, but, on the contrary, the height of the fixing protrusion 130 formed on the inner side support beam 121 may be lower than the height of the fixing protrusion 130 formed on the outer side support beam 122.

As illustrated in FIG. 4, the fixing part 210 provided in the leading-inner side pad spring 201 may include a first body 211, an upper surface-pressing rib 212 which is formed to extend from an upper surface of the first body 211 and presses an upper surface of the fixing protrusion 130, a lower surface-supporting rib 213 which is formed to extend from a lower surface of the first body 211 and presses a lower surface of the fixing protrusion 130, and side surface-pressing ribs 214 which are formed to extend from side surfaces of the first body 211 and press side surfaces of the fixing protrusion 130. In addition, each of the leading-outer side pad spring 202 illustrated in FIG. 5, the trailing-inner side pad spring 203 illustrated in FIG. 6, and the trailing-outer side pad spring 204 illustrated in FIG. 7 may also include the first body 211, the upper surface-pressing rib 212, the lower surface-supporting rib 213, and the side surface-pressing rib 214 which are described above.

The upper surface-pressing rib 212 is elastically deformed in a direction in which the upper surface-pressing rib 212 presses the upper surface of the fixing protrusion 130, and a front end of the upper surface-pressing rib 212 is formed to be curved upward so that the upper surface-pressing rib 212 is elastically deformed to be coupled to the fixing protrusion 130 when the pad spring 200 is coupled to the fixing protrusion 130.

In addition, since the lower surface-supporting rib 213 is formed to be in surface-contact with the lower surface of the fixing protrusion 130, a position of the pad spring 200 is stably fixed after the pad spring 200 is coupled to the fixing protrusion 130. In this case, since the pressing part 220, which is described above, is formed to extend in a state in which a front end of the lower surface-supporting rib 213 is also formed to be curved downward, the pad spring 200 may be easily coupled to the fixing protrusion 130.

In addition, the side surface-pressing ribs 214 which press the side surfaces of the fixing protrusion 130 may be provided, and thus, even in a case in which an external force or a braking torque is applied when the vehicle travels, the pad spring 200 may be stably fixed.

As illustrated in FIG. 3, a fixing groove 131 having a recessed shape may be formed in the fixing protrusion 130, and an auxiliary pressing rib 215 inserted into and disposed in the fixing groove 131 to prevent separation of the fixing part 210 may be provided on the fixing part 210.

That is, when the fixing part 210 is coupled to the fixing protrusion 130 only by the upper surface-pressing rib 212, the lower surface-supporting rib 213, and the side surface-pressing ribs 214, in a case in which an external force greater than an elastic pressing force is applied in a direction opposite to a coupling direction, the fixing part 210 may be randomly separated from the fixing protrusion 130, but, since the fixing groove 131 having the recessed shape is formed in the fixing protrusion 130, and the auxiliary pressing rib 215 is provided on the fixing part 210 to be inserted into and disposed in the fixing groove 131 as described above, even when the external force is applied in the direction opposite to the coupling direction, the fixing part 210 may be stably fixed so that the pad spring 200 may not be separated but may be stably fixed even in various travel environments.

As illustrated in FIG. 3, a hooking step may be formed on the fixing groove 131 to hook and support a front end of auxiliary pressing rib 215 in a case in which an external force is applied in the direction opposite to the coupling direction.

The pressing part 220 may include a second body 222 formed to extend from the retraction bar 221, and the retraction bar 221 may be elastically deformed in a state in which the retraction bar 221 extends from one side of the second body 222. That is, since the retraction bar 221 is formed to extend from one side of the second body 222, the pad plate is inserted into the pad spring 200 through the other side of the second body 222.

As described above, since the width w of the fixing protrusion 130 formed on the inner side support beam 121 is different from the width w of the fixing protrusion 130 formed on the outer side support beam 122, misassembly of the pad springs 201 and 203 installed at the inner side and the pad springs 202 and 204 installed at the outer side may be prevented. Although the misassembly of the leading side pad spring 201 and the trailing side pad spring 203 may occur because the sizes of the fixing parts 210 of the pad springs 201 and 203 installed at the inner side are the same, as described above, in the state in which the retraction bar 221 is formed to extend from one side of the second body 222, in a case in which the leading side pad spring 201 and the trailing side pad spring 203 are misassembled, since the retraction bar 221 is disposed in a form formed to extend from the other side of the second body 222, interference may occur therewith when the pad plate is inserted into the pressing part 220 so that the misassembly of the leading side pad spring 201 and the trailing side pad spring 203 may be prevented.

Identification parts 240 having different shapes may be formed on the pad springs 200 so that the worker may visibly check a misassembly state or a vision tester may automatically detect the misassembly after the pad springs 200 are installed.

In addition, the identification parts 240 include identification ribs 241 having shapes changed to be different from each other on the pad springs 200, and corresponding surfaces 140 having shapes corresponding to the identification ribs 241 may be formed on the pad carrier 100. That is, as illustrated in FIG. 4, the identification rib 241 extending upward may be formed on the leading-inner side pad spring 201, and the corresponding surface 140 extending upward may be formed on the pad carrier 100 to correspond to the identification rib 241. Meanwhile, as illustrated in FIG. 5, the identification rib 241 having a shape curved toward an installation surface of the pad carrier 100 may be formed on the leading-outer side pad spring 202, and the corresponding surface 140 having a shape recessed to correspond to the identification rib 241 may be formed on the pad carrier 100. In addition, as illustrated in FIG. 6, the identification rib 241 extending upward may be formed on the trailing-inner side pad spring 203, and the corresponding surface 140 extending upward to correspond to the identification rib 241 may be formed on the pad carrier 100. Meanwhile, as illustrated in FIG. 7, the identification rib 241 having a shape curved toward the installation surface of the pad carrier 100 may be formed on the trailing-outer side pad spring 204, and the corresponding surface 140 having a shape recessed to correspond to the identification rib 241 may be formed on the pad carrier 100.

Accordingly, in a case in which misassembly of the pad spring 200 occurs, since interference occurs between the identification rib 241 and the corresponding surface 140, the pad spring 200 may not be installed so that the worker may easily check a misassembly state.

Buffer ribs 232 elastically supporting the pad plates may be formed on the buffer parts 230. In a case in which an external force or a braking torque is applied when the vehicle travels, since the buffer ribs 232 are elastically deformed to support the pad plates, noise and vibration generated when the pad plates collide with the pad carrier 100 may be prevented.

In addition, guide ribs 231 and 223 which guide the pad plates to be inserted into the pad springs 200 may be formed on the buffer parts 230 and the pressing parts 220.

Since the pad spring is installed to basically apply an elastic force to the pad plate, a space formed inside the pad spring 200 is not large enough for the pad plate to be inserted into the pad spring 200 in a state in which the pad plate is not coupled to the pad spring 200. Accordingly, in order to insert the pad plate into the pad spring 200, the guide ribs 231 and 223 may be provided on the buffer part 230 and the pressing part 220 as described above, and thus the pad plate may be easily inserted into the pad spring 200.

According to the present invention having the above-described structure, since pad springs, which have retraction performances that are different at an inner side, an outer side, a leading side, and a trailing side of a pad carrier, for a vehicle brake are provided, elastic forces applied to pad plates can be variously adjusted to match with various braking specifications of a vehicle.

In addition, the pad springs may be prevented from being misassembled so that the pad springs can be installed at right positions, and thus the retraction performances matching with the vehicle braking specifications can be secured to effectively remove drag phenomena.

Effects of the present invention are not limited to the above-described effects and should be understood to include all effects which may be inferred from the detailed description of the present invention or elements of the present invention described in the claims.

While the embodiments of the present invention have been described above, the spirit of the present invention is not limited to the embodiments proposed in this specification, and other embodiments may be easily suggested by adding, changing, and deleting components by those skilled in the art and will fall within the spiritual range of the present invention.

What is claimed is:

1. Pad springs for a vehicle brake which are installed in a pad carrier to apply elastic forces in directions in which a pair of pad plates, each pad plate including a brake pad, is spaced apart from a disc when an operation of a vehicle brake is released,
   wherein the pad carrier includes a leading side support frame, a trailing side support frame, an inner side support beam, and an outer side support beam, wherein the support beams connect the support frames, and
   the pad spring is provided on each of the inner side support beam and the outer side support beam, and
   wherein at least one among a width, a length, and a thickness of a retraction bar provided on one of the pad springs is different from that provided on each of the remaining pad springs so that different elastic forces from the pad springs are applied to the pair of pad plates,
   wherein an identification part having a different shape is formed on each of the pad springs.

2. The pad springs of claim 1, wherein:
   the pad spring is provided at each of a leading side and a trailing side of each of the inner side support beam and the outer side support beam.

3. The pad springs of claim 1, wherein:
   the pad spring includes a fixing part fixed to the pad carrier, a pressing part including the retraction bar, and a buffer part configured to elastically support one of the pair of pad plates to prevent the one of the pair of pad plates from colliding with the pad carrier when braking is performed;

a fixing protrusion to which the fixing part is fixed is formed on the pad carrier; and a width of the fixing protrusion formed on the inner side support beam is different from a width of the fixing protrusion formed on the outer side support beam.

4. The pad springs of claim 3, wherein the fixing part includes:

a first body;

an upper surface-pressing rib which is formed to extend from an upper surface of the first body and presses an upper surface of the fixing protrusion;

a lower surface-supporting rib which is formed to extend from a lower surface of the first body and supports a lower surface of the fixing protrusion; and a side surface-pressing rib which is formed to extend from a side surface of the first body and presses a side surface of the fixing protrusion.

5. The pad springs of claim 3, wherein:

a fixing groove having a recessed shape is formed in the fixing protrusion; and an auxiliary pressing rib inserted into and disposed in the fixing groove is formed on the fixing part to prevent separation of the fixing part.

6. The pad springs of claim 3, wherein:

a second body from which the retraction bar is formed to extend is provided on the pressing part, and the retraction bar is elastically deformed in a state in which the retraction bar is formed to extend from one side of the second body.

7. The pad springs of claim 1, wherein:

the identification part includes an identification rib having a different shape in each of the pad springs; and a corresponding surface having a shape corresponding to the identification rib is formed on the pad carrier.

8. The pad springs of claim 3, wherein a buffer rib configured to elastically support the one of the pair of pad plates is formed on the buffer part.

9. The pad springs of claim 3, wherein guide ribs configured to guide the one of the pair of pad plates to be inserted into the one of the pair of pad plates are respectively formed in the buffer part and the pressing part.

10. Pad springs for a vehicle brake which are installed in a pad carrier to apply elastic forces in directions in which a pair of pad plates, each pad plate including a brake pad is spaced apart from a disc when an operation of a vehicle brake is released, wherein the pad carrier includes a leading side support frame, a trailing side support frame, an inner side support beam, and an outer side support beam, wherein the support beams connect the support frames, and the pad spring is provided on each of the inner side support beam and the outer side support beam, and wherein at least one among a width, a length, and a thickness of a retraction bar provided on one of the pad springs is different from that provided on each of the remaining pad springs so that different elastic forces from the pad springs are applied to the pair of pad plates, wherein:

the pad spring includes a fixing part fixed to the pad carrier, a pressing part including the retraction bar, and a buffer part configured to elastically support one of the pair of pad plates to prevent the one of the pair of pad plates from colliding with the pad carrier when braking is performed;

a fixing protrusion to which the fixing part is fixed is formed on the pad carrier; and a width of the fixing protrusion formed on the inner side support beam is larger than a width of the fixing protrusion formed on the outer side support beam, and height of the fixing protrusion formed on the inner side support beam is smaller than a height of the fixing protrusion formed on the outer side support beam.

11. Pad springs for a vehicle brake which are installed in a pad carrier to apply elastic forces in directions in which a pair of pad plates, each pad plate including a brake pad is spaced apart from a disc when an operation of a vehicle brake is released, wherein the pad carrier includes a leading side support frame, a trailing side support frame, an inner side support beam, and an outer side support beam, wherein the support beams connect the support frames, and the pad spring is provided on each of the inner side support beam and the outer side support beam, and wherein at least one among a width, a length, and a thickness of a retraction bar provided on one of the pad springs is different from that provided on each of the remaining pad springs so that different elastic forces from the pad springs are applied to the pair of pad plates, wherein:

the pad spring includes a fixing part fixed to the pad carrier, a pressing part including the retraction bar, and a buffer part configured to elastically support one of the pair of pad plates to prevent the one of the pair of pad plates from colliding with the pad carrier when braking is performed;

a fixing protrusion to which the fixing part is fixed is formed on the pad carrier; and a width of the fixing protrusion formed on the inner side support beam is smaller than a width of the fixing protrusion formed on the outer side support beam, and a height of the fixing protrusion formed on the inner side support beam is larger than a height of the fixing protrusion formed on the outer side support beam.

\* \* \* \* \*